US008525987B2

(12) United States Patent  (10) Patent No.: US 8,525,987 B2
Voigt et al. (45) Date of Patent: Sep. 3, 2013

(54) METHOD FOR OPERATING AN OPTICAL FILTER IN MULTIPLE MODES

(75) Inventors: Thomas Voigt, Export, PA (US); Michael Fuhrman, Pittsburgh, PA (US); Lei Shi, Pittsburgh, PA (US)

(73) Assignee: ChemImage Technologies LLC, Pittsburgh, PA (US)

( * ) Notice: Subject to any disclaimer, the term of this patent is extended or adjusted under 35 U.S.C. 154(b) by 170 days.

(21) Appl. No.: 13/199,859

(22) Filed: Sep. 12, 2011

(65) Prior Publication Data

US 2012/0062888 A1 Mar. 15, 2012

Related U.S. Application Data

(60) Provisional application No. 61/403,141, filed on Sep. 10, 2010.

(51) Int. Cl.
*G01J 3/44* (2006.01)
(52) U.S. Cl.
USPC .......................................... 356/301; 356/317
(58) Field of Classification Search
USPC ............. 356/301, 300, 317, 326, 72, 73, 419; 382/133, 321
See application file for complete search history.

(56) References Cited

U.S. PATENT DOCUMENTS

| 6,992,809 | B1 | 1/2006 | Wang |
| 7,286,231 | B2 | 10/2007 | Maier |
| 7,336,323 | B2 | 2/2008 | Wang |
| 7,362,489 | B2 | 4/2008 | Wang |
| 7,417,796 | B2 | 8/2008 | Wang |
| 7,420,679 | B2 * | 9/2008 | Treado et al. ................. 356/419 |
| 7,848,000 | B2 | 12/2010 | Wang |
| 8,379,193 | B2 * | 2/2013 | Gardner et al. ................. 356/73 |
| 8,395,769 | B2 * | 3/2013 | Stewart et al. ................. 356/301 |
| 2012/0310538 | A1 * | 12/2012 | Stewart et al. .................. 702/19 |

\* cited by examiner

*Primary Examiner* — Layla Lauchman

(57) ABSTRACT

A method for operating an optical filter in multiple modes. In one embodiment, an optical filter may be operated in a sensitivity mode to thereby generate a white light image representative of a region of interest. The optical filter may then be operated in a specificity mode to thereby generate a hyperspectral image representative of said region of interest. The white light image and the hyperspectral image may be fused to generate a hybrid image that provides morphological and hyperspectral data. The white light image and the hyperspectral image may be generated using a single detector, eliminating the need for image realignment.

19 Claims, 3 Drawing Sheets

100

| operating an optical filter in a sensitivity mode to thereby generate at least one white light image representative of a region of interest | 110 |

↓

| operating an optical filter in a specificity mode to thereby generate at least one hyperspectral image representative of said region of interest | 120 |

↓

| fusing said white light image and said hyperspectral image to thereby generate a hybrid image representative of said region of interest | 130 |

| | |
|---|---|
| operating an optical filter in a sensitivity mode to thereby generate at least one white light image representative of a region of interest, wherein said sensitivity mode comprises opening a plurality of bandpasses of said optical filter | 210 |
| ↓ | |
| operating an optical filter in a specificity mode to thereby generate at least one hyperspectral image representative of said region of interest, wherein said specificity mode comprises opening one bandpass of said optical filter, and wherein said white light image and said hyperspectral image are obtained without realigning said optical system | 220 |
| ↓ | |
| fusing said white light image and said hyperspectral image to thereby generate a hybrid image representative of said region of interest | 230 |

Figure 2

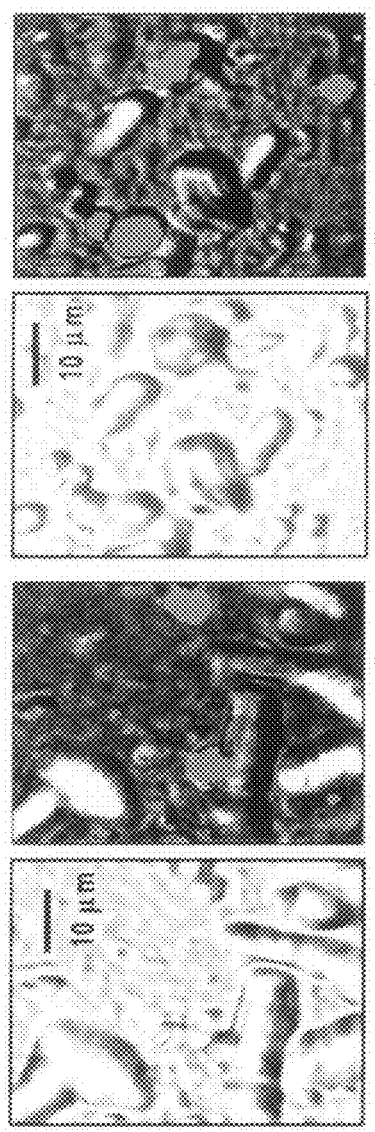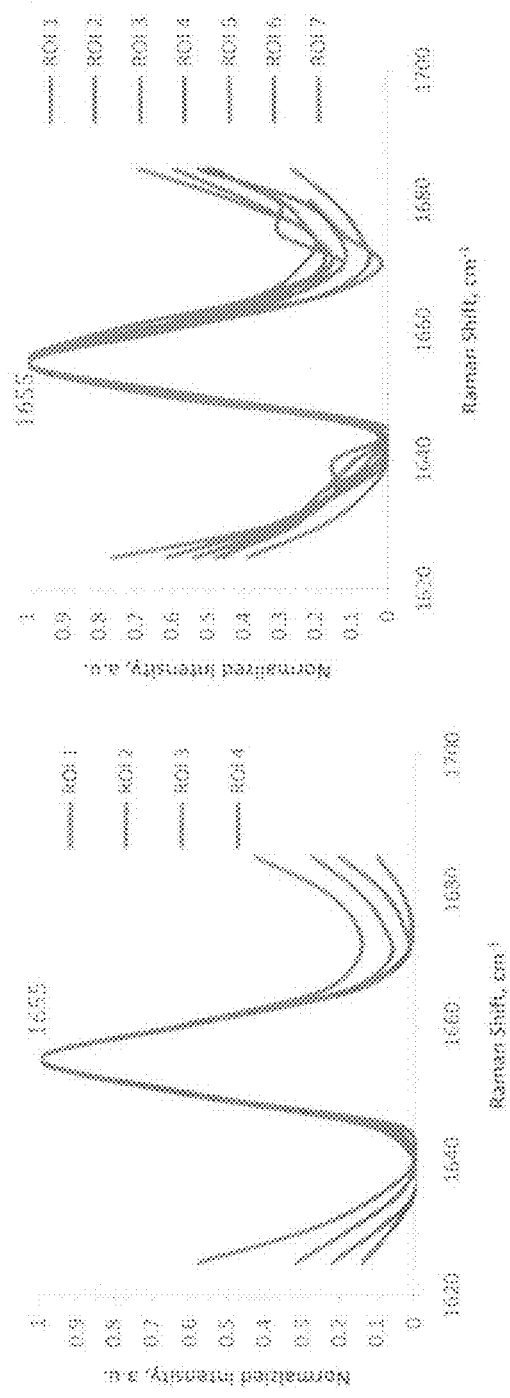
Figure 3

METHOD FOR OPERATING AN OPTICAL FILTER IN MULTIPLE MODES

RELATED APPLICATIONS

This application claims priority under 35 U.S.C. §119(e) to U.S. Provisional Patent Application No. 61/403,141, filed on Sep. 10, 2010, entitled "Systems and Methods for Improving Imaging Technology," which is hereby incorporated by reference in its entirety.

BACKGROUND

Spectroscopic imaging combines digital imaging and molecular spectroscopy techniques, which can include Raman scattering, fluorescence, photoluminescence, ultraviolet, visible and infrared absorption spectroscopies. When applied to the chemical analysis of materials, spectroscopic imaging is commonly referred to as chemical imaging. Instruments for performing spectroscopic (i.e. chemical) imaging typically comprise an illumination source, image gathering optics, focal plane array imaging detectors and imaging spectrometers.

In general, the sample size determines the choice of image gathering optic. For example, a microscope is typically employed for the analysis of sub micron to millimeter spatial dimension samples. For larger objects, in the range of millimeter to meter dimensions, macro lens optics are appropriate. For samples located within relatively inaccessible environments, flexible fiberscope or rigid borescopes can be employed. For very large scale objects, such as planetary objects, telescopes are appropriate image gathering optics.

For detection of images formed by the various optical systems, two-dimensional, imaging focal plane array (FPA) detectors are typically employed. The choice of FPA detector is governed by the spectroscopic technique employed to characterize the sample of interest. For example, silicon (Si) charge-coupled device (CCD) detectors or CMOS detectors are typically employed with visible wavelength fluorescence and Raman spectroscopic imaging systems, while indium gallium arsenide (InGaAs) FPA detectors are typically employed with near-infrared spectroscopic imaging systems.

Spectroscopic imaging of a sample can be implemented by one of two methods. First, a point-source illumination can be provided on the sample to measure the spectra at each point of the illuminated area. Second, spectra can be collected over the entire area encompassing the sample simultaneously using an electronically tunable optical imaging filter such as an acousto-optic tunable filter ("AOTF") or a LCTF. This may be referred to as "wide-field imaging". Here, the organic material in such optical filters are actively aligned by applied voltages to produce the desired bandpass and transmission function. The spectra obtained for each pixel of such an image thereby forms a complex data set referred to as a hyperspectral image ("HSI") which contains the intensity values at numerous wavelengths or the wavelength dependence of each pixel element in this image.

Spectroscopic devices operate over a range of wavelengths due to the operation ranges of the detectors or tunable filters possible. This enables analysis in the Ultraviolet ("UV"), visible ("VIS"), near infrared ("NIR"), short-wave infrared ("SWIR"), mid infrared ("MIR") wavelengths and to some overlapping ranges. These correspond to wavelengths of about 180-380 nm (UV), 380-700 nm (VIS), 700-2500 nm (NIR), 9850-1800 nm (SWIR), and 650-1100 nm (MIR), 1200-2450 nm (LWIR).

When operating in these wavelength ranges, certain objects will become visible in the resulting spectroscopic image. These objects may be referred to as "active" objects. Other "inactive" objects may not be visible in the spectroscopic image. It would be advantageous if a method would enable quick and reliable assessment of these "inactive" objects. This would enable visualization of previously invisible objects.

In certain situations, it may be advantageous to combine spectroscopic images with RGB or white light images of a region of interest to provide a more robust assessment of objects present in a field of view. It may be particularly advantageous to combine white light images with spectroscopic images when using a microscope based imaging system to analyze samples comprising unknown objects. The current state of the art requires using multiple optical devices or channels to generate these different types of images. Using multiple optical devices is expensive and time consuming. There exists a need for a method that would enable the generation of different types of images without requiring multiple optical devices.

SUMMARY OF THE INVENTION

The present disclosure provides for a method of operating an optical filter in multiple modes. In one mode, an optical filter may be configured to generate a white light image of a region of interest. Such white light image may provide morphological information such as size, shape, and color of unknown objects in a region of interest. In a second mode, the optical filter may be configured to generate a hyperspectral image of the region of interest. Such hyperspectral image may provide information that may be used to target and/or identify unknown objects based on spectral characteristics.

The "multi-mode" methodology described herein holds potential for overcoming the limitations of the prior art, which requires using multiple optical devices or channels for generating different types of images. The multi-mode capabilities of the invention disclosed herein holds potential for focusing unknown objects in a region of interest as spatially and spectrally resolved images on a detector. The method described herein provides for collecting image data in multiple modes, analyzing the image data, and creating a hybrid image that combines relevant information from multiple modes in one image. The method described herein also holds potential for eliminating the need for image realignment. Focusing for white light image capture will ensure spectroscopic images are also in focus.

The invention described herein holds potential for increasing speed, accuracy and reproducibility of images generated with optical filters. The method also holds potential for reducing the high cost and long processing times associated with current methodologies. The method of operating an optical filter described herein holds potential for a variety of applications including threat detection, anatomic pathology, ingredient-specific particle sizing, and forensics.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure.

FIG. 1 is illustrative of a method of the present disclosure.
FIG. 2 is illustrative of a method of the present disclosure.

FIG. 3 is representative of the detection capabilities of the present disclosure.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

The present disclosure provides for a method of operating an optical filter in multiple modes. Such a configuration holds potential for generating multiple types of images using a single optical filter. One mode of operation contemplated by the present disclosure may be referred to herein as a "sensitivity mode." In a sensitivity mode, an optical filter may be configured so as to open multiple bandpasses, allowing more light to pass through the filter. Opening these multiple bandpasses may also be referred to as allowing the optical filter to "leak." An image obtained while operating in a sensitivity mode may be referred to as a white light image. Such white light images comprise spatially resolved data of unknown objects in a region of interest. White light images provide information as to what may be present in a region of interest. These white light images provide recognizable visual data to a user. This data may comprise morphological data such as size, shape, and color of unknown objects. Due to the morphological information that may be generated while operating in this mode, it may also be referred to as a "morphological mode."

Another mode of operation contemplated by the present disclosure may be referred to herein as a "specificity mode." In a specificity mode, an optical filter may be configured to open a single bandpass to generate hyperspectral data representative of a region of interest. In one embodiment, this hyperspectral data may comprise at least one hyperspectral image.

One embodiment of the present disclosure is illustrated by FIG. 1. In such an embodiment, the method 100 provides for operating an optical filter in a sensitivity mode in step 110 to thereby generate at least one white light image representative of a region of interest, wherein the region of interest comprises one or more unknown objects. A white light image may be further analyzed to thereby assess at least one morphological characteristic of at least one unknown object. This morphological characteristic may comprise: size of an unknown object, shape of an unknown object, color of an unknown object, and combinations thereof. In one embodiment, this analysis may be achieved by visual inspection by a user. In another embodiment, this analysis may be achieved by comparing the white light image to a reference data set in a reference data base. In such an embodiment, each reference data set is associated with a morphological characteristic of a known object.

In step 120 the optical filter may be operated in a specificity mode to thereby generate at least one hyperspectral image representative of the region of interest. In one embodiment, this hyperspectral image may comprise at least one of: a hyperspectral Raman image, a hyperspectral infrared image, a hyperspectral visible image, a hyperspectral ultraviolet image, a hyperspectral fluorescence image, a hyperspectral LIBS image, and combinations thereof. In one embodiment, a hyperspectral infrared image may comprise at least one of: a short wave infrared hyperspectral image, a near infrared hyperspectral image, a mid infrared hyperspectral image, a long wave infrared hyperspectral image, and combinations thereof.

In one embodiment, the present disclosure contemplates that a hyperspectral image generated in a specificity mode may be further analyzed to thereby target an unknown object, identify an unknown object, and combinations thereof. In one embodiment, this analysis may be achieved by visual inspection by a user. In another embodiment this analysis may be achieved by comparing said hyperspectral image to at least one reference data set in a reference database. In such an embodiment, each said reference data set may comprise data associated with a known object. In one embodiment, this data may comprise at least one of: a spectrum, a spatially accurate wavelength resolved image, a hyperspectral image, and combinations thereof.

In one embodiment, method 100 may further comprise generating said white light image and said hyperspectral image using a single detector. In one embodiment, this detector may comprise a focal plane array. In one embodiment, this detector may be selected from the group consisting of: a CMOS detector, a CCD detector, a ICCD detector, an InGaAs detector, an InSb detector, a MCT detector, and combinations thereof.

An embodiment providing for generating white light images and hyperspectral images using a single detector eliminates the need to switch between multiple detectors. Such an embodiment holds potential for fast and accurate overlay of white light and hyperspectral images. Image quality and application time may also be improved. Such a configuration also eliminates the need for image re-alignment between the white light and hyperspectral images. Only the electronic driving parameter is changing, switching from one mode to another.

Another embodiment of the present disclosure contemplates the use of multiple detectors sharing a common optical filter and collection optics.

In step 130 the method 100 provides for fusing or overlaying a white light image with a hyperspectral image to thereby generate a hybrid image representative of a region of interest. This hybrid image may provide morphological and spectral information relating to unknown objects in the region of interest. Combining these different types of information holds potential for more accurate and reliable analysis of images resulting to more accurate and reliable targeting and identification of unknown objects. This hybrid image may be further analyzed using visual inspection, a reference database, and combinations thereof.

In one embodiment, this fusion may be accomplished using Bayesian fusion. In another embodiment, this fusion may be accomplished using technology available from ChemImage Corporation, Pittsburgh, Pa. This technology is more fully described in the following pending U.S. Patent Applications: No. US2009/0163369, filed on Dec. 19, 2008 entitled "Detection of Pathogenic Microorganisms Using Fused Sensor Data," Ser. No. 13/081,992, filed on Apr. 7, 2011, entitled "Detection of Pathogenic Microorganisms Using Fused Sensor Raman, SWIR and LIBS Sensor Data," No. US2009/0012723, filed on Aug. 22, 2008, entitled "Adaptive Method for Outlier Detection and Spectral Library Augmentation," No. US2007/0192035, filed on Jun. 9, 2006, "Forensic Integrated Search Technology," and No. US2008/0300826, filed on Jan. 22, 2008, entitled "Forensic Integrated Search Technology With Instrument Weight Factor Determination." These applications are hereby incorporated by reference in their entireties.

In one embodiment, comparison of white light, hyperspectral, and/or hybrid images may be achieved by applying a chemometric technique. This chemometric technique may be selected from the group consisting of: principle components analysis, partial least squares discriminate analysis, cosine correlation analysis, Euclidian distance analysis, k-means clustering, multivariate curve resolution, band t. entropy method, mahalanobis distance, adaptive subspace detector, spectral mixture resolution, and combinations thereof.

Another embodiment of the present disclosure is illustrated by FIG. 2. In such an embodiment, a method 200 may comprise operating an optical filter in step 210 in a sensitivity mode to thereby generate at least one white light image representative of a region of interest, wherein said sensitivity mode comprises opening a plurality of bandpasses of said optical filter. In step 220 said optical filter may be operated in a specificity mode to thereby generate at least one hyperspectral image representative of said region of interest, wherein said specificity mode comprises opening one bandpass of said optical filter, and wherein said white light image and said hyperspectral image are obtained without realigning said optical system. In step 230 said white light image and said hyperspectral image may be fused to thereby generate a hybrid image representative of said region of interest.

The present disclosure contemplates that the method described herein may utilized in the operation of a wide variety of optical filters. In one embodiment, the method may be applied to the operation of at least one of: a liquid crystal tunable filter, a multi-conjugate liquid crystal tunable filter, an acousto-optical tunable filter, a Lyot liquid crystal tunable filter, an Evans split-element liquid crystal tunable filter, a Solc liquid crystal tunable filter, a ferroelectric liquid crystal tunable filter, a Fabry Perot liquid crystal tunable filter, and combinations thereof.

In one embodiment, this tunable filter may comprise filter technology available from ChemImage Corporation, Pittsburgh, Pa. This technology is more fully described in the following U.S. patents and patent applications: U.S. Pat. No. 6,992,809, filed on Jan. 31, 2006, entitled "Multi-Conjugate Liquid Crystal Tunable Filter," U.S. Pat. No. 7,362,489, filed on Apr. 22, 2008, entitled "Multi-Conjugate Liquid Crystal Tunable Filter," Ser. No. 13/066,428, filed on Apr. 14, 2011, entitled "Short wave infrared multi-conjugate liquid crystal tunable filter." These patents and patent applications are hereby incorporated by reference in their entireties.

The "multi-mode" configuration disclosed herein holds potential for visualizing "inactive" objects in a spectroscopic image. Operating in a sensitivity mode provides for imaging at all wavelengths simultaneously, allowing objects that may be inactive in a spectroscopic image to become visible. This provides an overall perspective of a region of interest. Operating in a specificity mode provides hyperspectral data that may be used to target and/or identify specific unknown objects in a region of interest. Combining these two types of images by the method disclosed herein provides for an information-rich hybrid image that can be acquired quickly and accurately without realigning the images. FIG. 3 illustrates some potential detection capabilities associated with the combination of white light and spectroscopic images. Specifically, FIG. 3 illustrates white light and Raman chemical imaging of budesonide particles in representative Rhinocort Aqua® actuated droplet samples.

While the disclosure has been described in detail in reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A method for operating an optical system comprising:
   operating an optical filter in a sensitivity mode to thereby generate at least one white light image representative of a region of interest;
   operating said optical filter in a specificity mode to thereby generate at least one hyperspectral image representative of said region of interest; and
   fusing said white light image and said hyperspectral image to thereby generate a hybrid image representative of said region of interest.

2. The method of claim 1 wherein said white light image and said hyperspectral image are obtained without realigning said optical system.

3. The method of claim 1 further comprising analyzing said white light image to thereby assess at least one morphological characteristic of an unknown object in said region of interest.

4. The method of claim 3 wherein said morphological characteristic comprises at least one of: size of an unknown object, shape of an unknown object, color of an unknown object, and combinations thereof.

5. The method of claim 1 further comprising assessing said hyperspectral image to thereby target unknown object, identify an unknown object, and combinations thereof.

6. The method of claim 1 wherein said white light image and said hyperspectral image are generated using one detector.

7. The method of claim 6 wherein said detector is selected from the group consisting of: an ICCD, a CCD, a CMOS detector, an InGaAs detector, an InSb detector, a MCT detector, and combinations thereof.

8. The method of claim 1 wherein said white light image is generated using a first detector and said hyperspectral image is generated using a second detector.

9. The method of claim 8 wherein at least one of said first detector and said second detector are selected from the group consisting of: an ICCD, a CCD, a CMOS detector, an InGaAs detector, an InSb detector, a MCT detector, and combinations thereof.

10. The method of claim 8 wherein said detector comprises a focal plane array detector.

11. The method of claim 1 further comprising switching between operation in a sensitivity mode and operation in a specificity mode.

12. The method of claim 1 further comprising assessing at least one of said white light image and said hyperspectral image wherein said assessing is achieved by applying at least one chemometric technique.

13. The method of claim 12 wherein said chemometric technique is selected from the group consisting of: principle components analysis, partial least squares discriminate analysis, cosine correlation analysis, Euclidian distance analysis, k-means clustering, multivariate curve resolution, band t. entropy method, mahalanobis distance, adaptive subspace detector, spectral mixture resolution, and combinations thereof.

14. The method of claim 1 wherein said operation in said sensitivity mode further comprises opening a plurality of bandpasses of said optical filter.

15. The method of claim 1 wherein said operation in said specificity mode further comprises opening one bandpass of said optical filter.

16. The method of claim 1 wherein said optical filter comprises at least one of: a liquid crystal tunable filter, a multi-conjugate liquid crystal tunable filter, an acousto-optical tunable filter, a Lyot liquid crystal tunable filter, an Evans split-element liquid crystal tunable filter, a Solc liquid crystal tunable filter, a ferroelectric liquid crystal tunable filter, a Fabry Perot liquid crystal tunable filter, and combinations thereof.

17. The method of claim 1 wherein said hyperspectral image comprises at least one of: a hyperspectral Raman image, a hyperspectral infrared image, a hyperspectral fluorescence image, a hyperspectral visible image, a LIBS hyperspectral image, an ultraviolet hyperspectral image, and combinations thereof.

18. The method of claim 17 wherein said hyperspectral infrared image comprises at least one of: a SWIR hyperspectral image, a NIR hyperspectral image, a MWIR hyperspectral image, a LWIR hyperspectral image, and combinations thereof.

19. A method for operating an optical system comprising:
   operating an optical filter in a sensitivity mode to thereby generate at least one white light image representative of a region of interest, wherein said sensitivity mode comprises opening a plurality of bandpasses of said optical filter;
   operating an optical filter in a specificity mode to thereby generate at least one hyperspectral image representative of said region of interest, wherein said specificity mode comprises opening one bandpass of said optical filter, and
   wherein said white light image and said hyperspectral image are obtained without realigning said optical system; and
   fusing said white light image and said hyperspectral image to thereby generate a hybrid image representative of said region of interest.

* * * * *